UNITED STATES PATENT OFFICE.

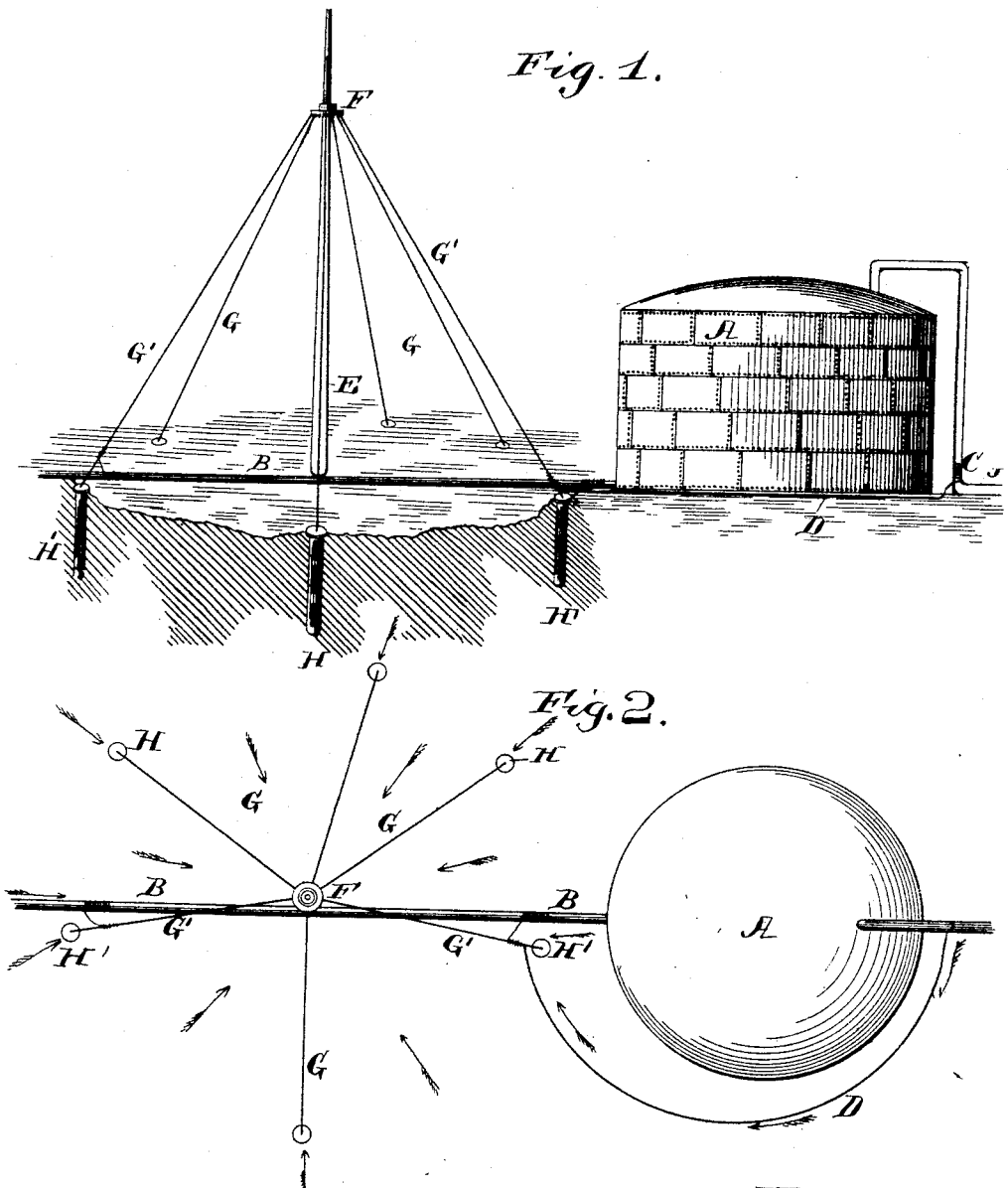

HENRY W. SPANG, OF NEW YORK, N. Y.

LIGHTNING-PROTECTOR FOR OIL-TANKS.

SPECIFICATION forming part of Letters Patent No. 437,526, dated September 30, 1890.

Application filed January 28, 1890. Serial No. 338,379. (No model.)

*To all whom it may concern:*

Be it known that I, HENRY W. SPANG, a citizen of the United States, residing at New York city, in the county of New York and State of New York, have invented certain new and useful Improvements in Lightning Protectors for Oil-Tanks; and I do hereby declare the following to be a full, clear, and exact description of the invention, reference being had to the accompanying drawings, which form part of this specification.

My invention has relation to electric or lightning conductors for oil-tanks; and my invention has for its object the provision of novel means for protecting oil-tanks and similar structures from damage or destruction by lightning or electrical discharges.

It is a well-established fact that there is a strong flow of electricity from all directions in the earth toward a central point, in line with which the electricity of the air and earth unite during a lightning discharge, and also that the said electricities will invariably select the metallic gas, water, oil, and other pipes in or over the earth's surface for their path wherever they are present. It is owing to the great affinities that the said electricities have for the metallic delivery and supply pipes connecting with an oil-tank and the fact that the oil-tank is the highest object connected with said pipes that the said tank is selected as the central point, in line with which the electricities unite during a lightning discharge, resulting in the ignition of the gas and oil in the tank and its destruction by fire.

My invention consists in the employment of a radial system of electrical conductors, in combination with the delivery or supply pipe of an oil-tank arranged at a suitable distance from the tank, so that the central point of a lightning discharge will be in line with the radial system of conductors at a distance from the tank, thereby exerting no force or strain upon the tank and its contents during a thunder-storm and fully protecting them from damage or destruction.

In the accompanying drawings, Figure 1 is an elevation of a tank with a system of conductors applied to its delivery-pipe and also connecting with the supply-pipe of the same, illustrating my invention; and Fig. 2 is a plan view of the same.

Referring to the drawings, A designates an oil-tank, which, when used for storing the product of one or more adjacent wells, is usually built of wood, and when used for general storage purposes for the product of a number of wells or along an oil-pipe line is usually built of iron.

B designates the metallic supply-pipe, and C the metallic delivery-pipe, said pipes being electrically connected together by means of the wire cable or other suitable metallic conductor D.

E designates a substantial upright metallic tube or other suitable conductor pointed at the top and well embedded in the earth. Said upright conductor should be not less than fifty feet in height above the ground and located not less than one hundred feet from tank A.

G G G G and G' G' designate radial conductors, which may consist of wire rope and are secured to a ring or plate F, fixed at a short distance from the upper extremity of upright conductor E. The lower extremities of the conductors G G' are preferably secured to metallic earth terminals H H H H H' H', placed at equal distances from each other, as shown in Fig. 2. The main conductor E must be well connected electrically with the delivery-pipe C, which in most cases is the longest underground metallic pipe connected with the oil-tank A, and for which pipe C the electricity of earth and air will have the greatest affinity during a thunder-storm. The conductors G' G' and earth terminals H' H' must also be well connected electrically with the delivery-pipe C, and when pipe C or pipe B is near an oil-well it is also necessary to extend conductor D and connect it with the iron pipe of the oil-well, for which during a lightning discharge the electricity has also an affinity.

By the arrangement of conductors shown and described the electricity of the air will flow toward the top of the main conductor E and that of the earth principally in the direction of the arrows shown in Fig. 2 during a lightning discharge, so that tank A is not subjected to any dangerous electrical force or strain during a thunder-storm.

While the radial arrangement of conductors shown in Letters Patent of the United States, No. 286,086, granted to me October 2, 1883, will serve to relieve an oil-tank of any dangerous electrical force or strain and protect the tank, the herein-described arrangement of conductors, in combination with the upright conductor C at a distance from the tank, reduces the liability to damage or ignition of the tank and contents to a minimum during a thunder-storm, and is an important improvement upon all other plans heretofore suggested for the protection of oil-tanks.

Having fully described my invention, I claim—

1. The combination, with an oil-tank and a pipe connecting therewith, of an upright electrical conductor located at a suitable distance from said tank and electrically connected with said pipe, substantially as described.

2. The combination, with an oil-tank and its supply or discharge pipe, of an upright conductor arranged at a suitable distance from said tank in proximity to said pipe, and a series of conductors electrically connected together near the top of said upright conductor and leading to earth at points away from and around the base of the same, substantially as described.

3. The combination, with an oil-tank and supply and discharge pipes connecting therewith, of an upright electrical conductor arranged at a suitable distance from said tank and electrically connected with said supply and discharge pipes, substantially as described.

4. The combination, with an oil-tank and supply and discharge pipes leading thereto, of an upright electric conductor arranged at a suitable distance from the said tank and electrically connected to said supply and discharge pipes, and a series of radial conductors electrically connected together near the top of said upright conductor and grounded at points around and at a distance from the base thereof, substantially as described.

In testimony that I claim the foregoing I have hereunto set my hand this 13th day of December, 1889.

HENRY W. SPANG.

Witnesses:
DAVID A. HAYNES,
ROBT. L. WENSLEY.